J. DAVIS.

Improvement in Wash-Boilers.

No. 5,350. Reissued April 15, 1873.

Witnesses:

A. W. Almquist

C. Sedgwick

Inventor:

J. Davis

Per Munn & Co

Attorneys.

UNITED STATES PATENT OFFICE.

JACOB DAVIS, OF FLORIDA, MASSACHUSETTS.

IMPROVEMENT IN WASH-BOILERS.

Specification forming part of Letters Patent No. 131,212, dated September 10, 1872; reissue No. 5,350, dated April 15, 1873; application filed February 5, 1873.

*To all whom it may concern:*

Be it known that I, JACOB DAVIS, of Florida, in the county of Berkshire and State of Massachusetts, have invented a new and useful Improvement in Clothes-Washers, of which the following is a specification:

My invention has for its object to furnish an improved washer or washing-machine for washing cloth, clothes, bedding, &c., quickly and thoroughly, without wearing the cloth, straining the seams, or injuring them in any way; and it consists in the device constructed as hereinafter more fully described, and adapted to be applied to any water-tight vessel. Without altering the main principles of this invention it may be made to fit into any vessel, large or small, vat, tub, or boiler, the invention consisting in the construction of the said machine for the purpose of washing clothes when applied to any vessel which it will fit.

Figure 1:
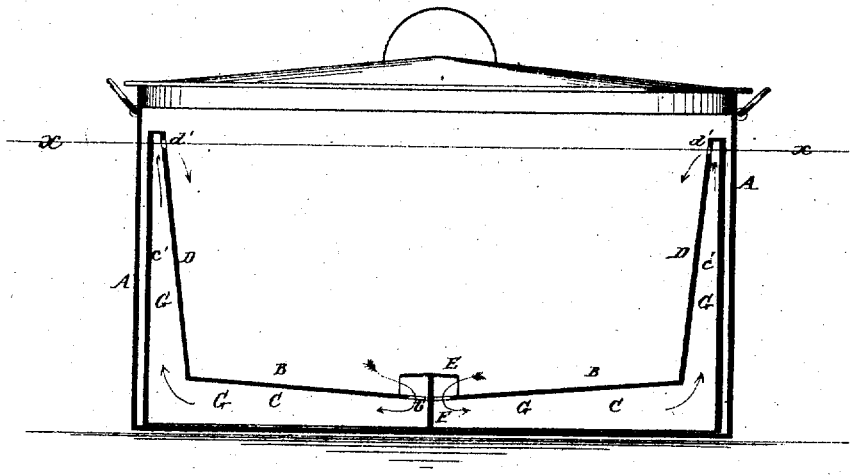
Figure 2:
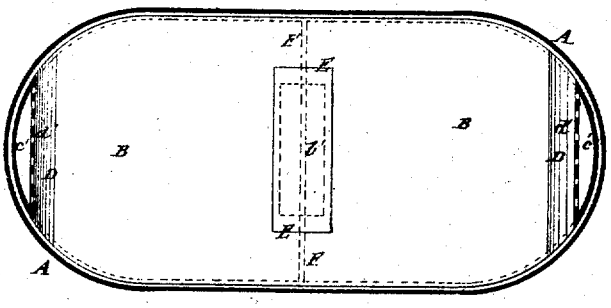

In the accompanying drawing, Figure 1 is a vertical longitudinal section of my improved washer and of a boiler into which it fits. Fig. 2 is a horizontal section of the same taken through the line *x x*, Fig. 1.

Similar letters of reference indicate corresponding parts.

A represents an ordinary oblong or oval boiler. This boiler is no part of, and is not necessary to, my invention, as any other vessel can be used, and the washer made of the proper size and shape to fit into it. B is the bottom of the washer, so formed as to fit into the vessel A, and which is supported at a little distance above the bottom of the vessel A by flanges C attached to its side edges, the lower edges of which flanges rest upon the bottom of the vessel A. At the ends of the vessel A portions *c'* of the flanges C extend up nearly to the top of the vessel A. The bottom B inclines upward from its center toward each end, and its ends are cut off before quite reaching the upwardly-projecting portions *c'* of the flanges C. The plates D incline outward as they extend upward, and their upper end edges are secured to the upper end edges of the upwardly-projecting portions *c'* of the flanges C, or are connected with said end edges by a cap-plate. In the plates D, at or near their upper ends, is formed a series of small holes, *d'*, as shown in Figs. 1 and 2. In the central part of the bottom B of the washer is formed a transverse slot, *b'*, which is covered, to prevent the clothes from getting into it and thus interfering with the proper operation of the washer, by a plate, E, a little wider than the slot *b'*, and the ends of which are bent downward and are secured to the side parts of the said bottom B. The plate E is supported by a plate, F, the upper edge of which is attached to the middle part of the plate E. The plate F projects down through the center of the slot *b'* of the bottom B of the washer so that its lower end may rest upon the bottom of the vessel or boiler A. The end parts of the plate F project beneath the side parts of the bottom B of the washer to the flanges C, to which they are attached, or said side parts may rest upon the bottom of the vessel A. No portion of the washer is attached to any portion of the vessel A, but the washer fits perfectly to the vessel A. The plate F thus divides the space beneath the bottom B into two compartments. By this construction two flues, G, are formed, gradually increasing in depth toward the ends of the boiler or vessel A, and gradually decreasing toward the top of the same, the bottom of the lower parts of the flues being formed by the vessel A. The flues G communicate with the interior of the vessel A at one end through the slot *b'* in the bottom B of the washer, and at their other ends through the holes *d'* in the upper parts of the plates D. Heat may be applied to the washer by placing the vessel into which it is fitted upon a stove, range, furnace, or other heater, or by introducing steam from a steam-generator through a pipe. By this construction, as the heat is applied beneath the vessel the water beneath the bottom B of the washer is forced up through the flues G, and spurts through the holes *d'* upon the clothes in the interior of the vessel A, and passing through the clothes enters the space beneath the bottom B through the slot *b'*; then is forced by the steam or air-bubbles back into the flues G, thus keeping up a continuous circulation, cleaning the clothes thoroughly in a very short time.

It is understood that my process is not boiling the clothes, neither is it applying steam to them; I do neither. I force hot water through them. Steam may be the force, but water is the agent which comes in contact with and washes the clothes.

In case of round or square vessels the circulation may be established through a single tube, passing up through the center of the vessel.

Having thus described my invention, what I claim, and desire to secure by Letters Patent, is—

1. The arrangement of the inclined bottom B with the slot $b'$, raised cover E, and plate F, as and for the purposes above described.

2. The construction and arrangement of the flues G as above specified, for the purpose of forcing the hot water through the holes $d'$ upon the clothes.

3. A bottom, B, having slot $b'$, raised cover E, and plates D, with perforations $d'$ at the top only, applied in combination with any suitable vessel, substantially as and for the purpose described.

JACOB DAVIS.

Witnesses:
HENRY W. WILLIAMS,
DAVID J. BUTLER.